United States Patent [19]

Terada et al.

[11] Patent Number: 4,991,052
[45] Date of Patent: Feb. 5, 1991

[54] DIFFERENTIAL PROTECTIVE RELAY APPARATUS

[75] Inventors: Makoto Terada, Tokyo; Yosuke Tsujikura, Hyogo, both of Japan

[73] Assignee: Mitsubishi Denki Kabushiki Kaisha, Tokyo, Japan

[21] Appl. No.: 438,109

[22] Filed: Nov. 20, 1989

[30] Foreign Application Priority Data

Jan. 18, 1989 [JP] Japan ................................. 64-7714

[51] Int. Cl.$^5$ ............................................ H02H 2/08
[52] U.S. Cl. ........................................ 361/65; 361/44; 361/45; 361/192
[58] Field of Search ....................... 361/62, 65, 44, 45, 361/86, 192, 193

[56] References Cited

U.S. PATENT DOCUMENTS 4,020,396 4/1977 Gambale et al. ............... 361/45 X
4,443,828 4/1984 Legrand et al. ............... 361/44 X
4,862,308 8/1989 Udren ........................... 361/45 X Primary Examiner—Derek S. Jennings
Attorney, Agent, or Firm—Bernard, Rothwell & Brown

[57] ABSTRACT

An apparatus for differential-protection of a bus bar having a plurality of terminals which includes a plurality of trunk lines, in which an impedance of a differential circuit connected in parallel to a current transformer provided in each of the terminals is changed depending on either a terminal voltage of this differential circuit, or another terminal voltage derived from a part of the impedances. Then, either a high impedance differential relay, or a low impedance differential relay is selectively available so as to confirmly detect a fault in the bus bar.

7 Claims, 5 Drawing Sheets

DIFFERENTIAL PROTECTIVE RELAY APPARATUS

BACKGROUND OF THE INVENTION

1. Field of the Invention

The present invention relates to a differential protective relay apparatus in which a plural-branch bus bar including a plurality of terminals is differentially protected via a current transformer provided in the lines respectively.

2. Description of the Prior Art

FIG. 1 shows a system connection diagram of a differential protective relay apparatus. Symbol "0" indicates a bus bar; numerals 1 to n denote terminals drawn from the bus bar "0", numerals CT 11 to CT 1n represents current transformers (simply referred to as a "CT" hereinafter) connected to the respective terminals 1 to n; and symbol "$Z_D$" represents an impedance of a differential circuit 20 which is shunted by parallel-connection of secondary circuits of the above-described CT 11 to CT 1n.

In general, a differential protective relay apparatus may be categorized into two typical differential types, i.e., a high impedance differential type and a low impedance differential type by selecting either a high impedance, or a low impedance as the impedance "$Z_D$" of the above-described differential circuit 20.

In accordance with the former high-impedance differential type, since the differential circuit is shunted by the relatively high impedance $Z_D$, the shunted current components from the current transformers CT 11 to CT 1n which are differentially connected are small and only a small amount of energy is transferred. As a result, in the case that the currents flow into the differential circuit 20 in the same direction upon an internal fault, a relatively high voltage appears across the impedance $Z_D$ of the differential circuit 20. Whereas, in the case that the shunted current is circulated through CT 11 to CT 1n which are differentially connected upon an external fault, the lead wire resistances of the secondary circuits of the differentially connected CT 11 to CT 1n are added to the exciting impedance of the CT at the current flowing terminal on the external fault, and thus the voltage drops appearing across the resistances do not exceed a value determined by the voltage drop vs current of the CT exciting characteristics.

In, on the other hand, the low impedance differential apparatus, a large amount of the shunted current component flows from the differentially connected CT 11 to CT 1n to the impedance $Z_D$, and thus most energy is transferred to the differential circuit side.

As a consequence, the voltage appearing across the impedance of the differential circuit does not go up so high in case of an internal failure.

Whereas, on an external fault, the secondary exciting impedance of the CT 1n of the current flowing out terminal and the impedance of the differential circuit (Zd) show values of equal order or else the latter shows a lower value, which causes a larger shunt current through the differential circuit impedance Zd, by the voltage drop induced along the lead wire resistance of the CT secondary circuit of differentially connected CTs 11 ~ 1n−1.

As a consequence, there is a trend in the low impedance differential type scheme that malfunctions are apt to occur when a heavy external fault current flows.

In general, assuming that the resistance value of the differential circuit 20 is "$R_D$", and total resistance value in the reciprocating path of the lead wire and the like of the CT secondary circuit (the secondary winding resistance value "$R_S$" of CT and also the resistance value "$R_L$" of CT secondary lead wire) is "$R_2$", when the maximum external fault current $I_{FE}$max passes, both the differential circuit current "$I_D$" and differential circuit voltage (i.e., a voltage across the impedance $Z_D$) $V_D$ are expressed as follows.

$$I_D \leq \frac{R_2}{R_D + R_2} I_{FE}\text{max} \quad (1.1)$$

$$V_D \leq \frac{R_D R_2}{R_D + R_2} I_{FE}\text{max} \quad (1.2)$$

If $R_D >> R_2$, then $$V_D \leq R_2 I_{FE}\text{max} \quad (1.3)$$

The differential circuit voltage does not exceed over a predetermined value.

On the other hand, in case of an internal fault, when the voltage "$V_D$" of the differential circuit appearing across the impedance $Z_D$ is detected by the setting sensitivity of the applied voltage $V_S$, a minimum internal fault detecting current is given by:

$$I_F\text{min} = \frac{V_S}{R_D} + n \cdot I_{ex}(V_S) \quad (1.4)$$

It should be noted that "$I_{ex}(V_S)$" is a secondary exciting current with respect to the applied voltage, and "n" denotes the number of connected lines for the protected bus bars.

Since the conventional high impedance differential protective relay schemes are arranged in the above-described configurations and operations, the high impedance differential apparatus has the following problems.

Although the differential relay can be set to prevent false operation on external faults below the value expressed as in the formula (1.3), the minimum pick-up current of an internal fault should satisfy the formula (1.4) as long as the relay is set to the value determined by the formula (1.3).

In other words, in the conventional apparatus, there are drawbacks that, when the number of terminals connected to the bus bar becomes large and furthermore the internal fault current is smaller, the minimum pick-up sensitivity is adversely affected by both the secondary excitation characteristic "$I_{ex}-V_{ex}$" of the current transformer and the number of terminals "n".

SUMMARY OF THE INVENTION

An object of the present invention is to provide a differential protective relay apparatus such that either a high impedance differential circuit or a low impedance differential circuit is automatically switched over, and the sensitivity of the differential protective relay apparatus is increased by effectively utilizing the advantages of both the respective high and low impedance differential scheme even if an internal fault current is small, whereby an improved figure of merit for fault detection can be obtained.

To achieve the above-described object, a bus bar differential protective relay apparatus according to the present invention comprises:

a first switching over circuit for changing an impedance of a differential circuit in response to a terminal voltage of said differential circuit;

a second switching over circuit for changing said impedance into another impedance different from the impedance set by said first switching over circuit in response to the terminal voltage of said impedance;

a set of voltage detecting elements for detecting said terminal voltage of said differential circuit and said terminal voltage of said impedance; and, an interlock circuit for tripping a circuit breaker comprising of said respective voltage detecting element outputs.

DETAILED DESCRIPTION OF THE PREFERRED EMBODIMENTS

Referring now to the accompanying drawings, a detailed description will be made for a differential protective relay apparatus according to a preferred embodiment of the invention.

Figure 1:
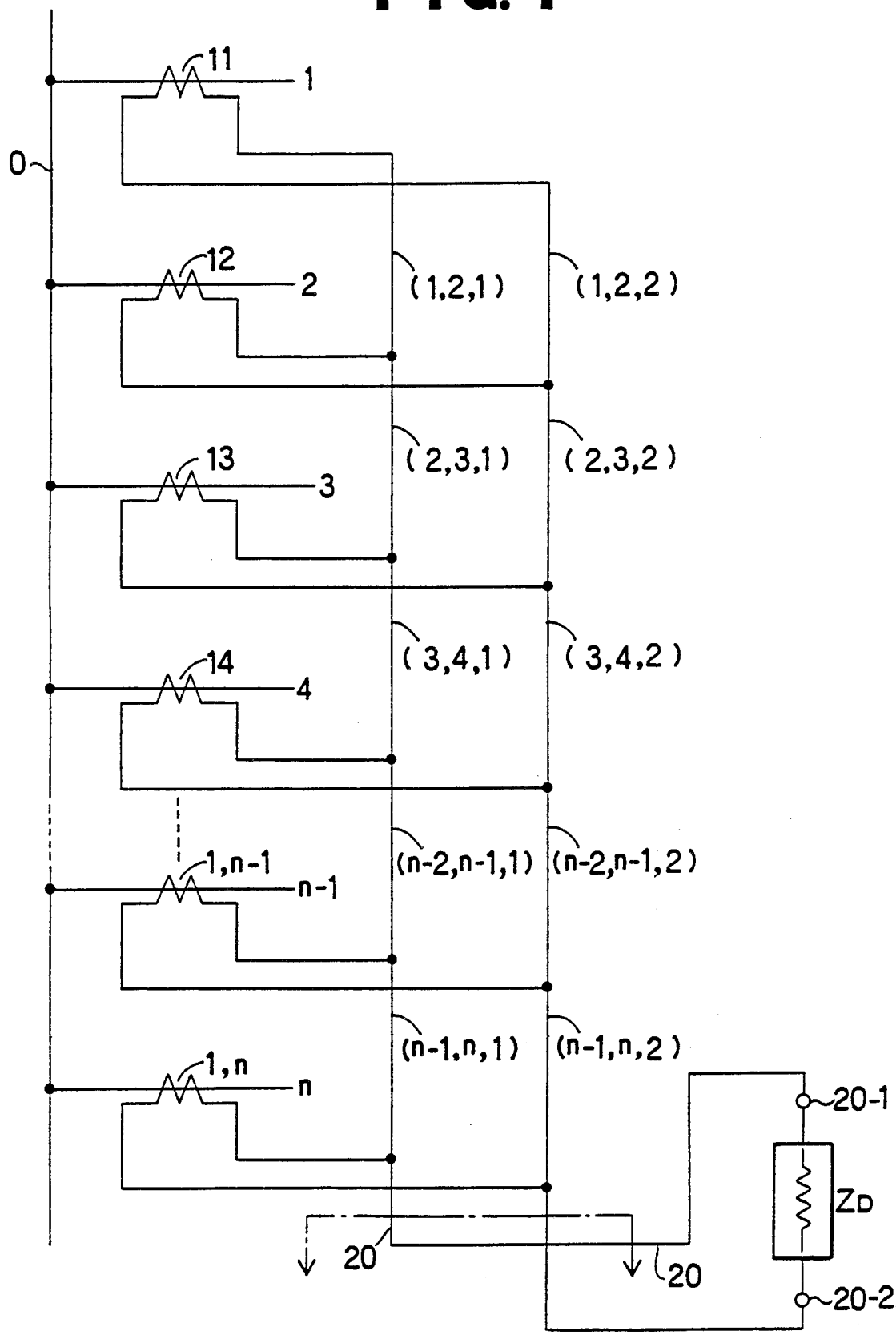
FIG. 1 is a power system connection diagram to which a differential protective relay apparatus according to the present invention is applied.
Figure 2:
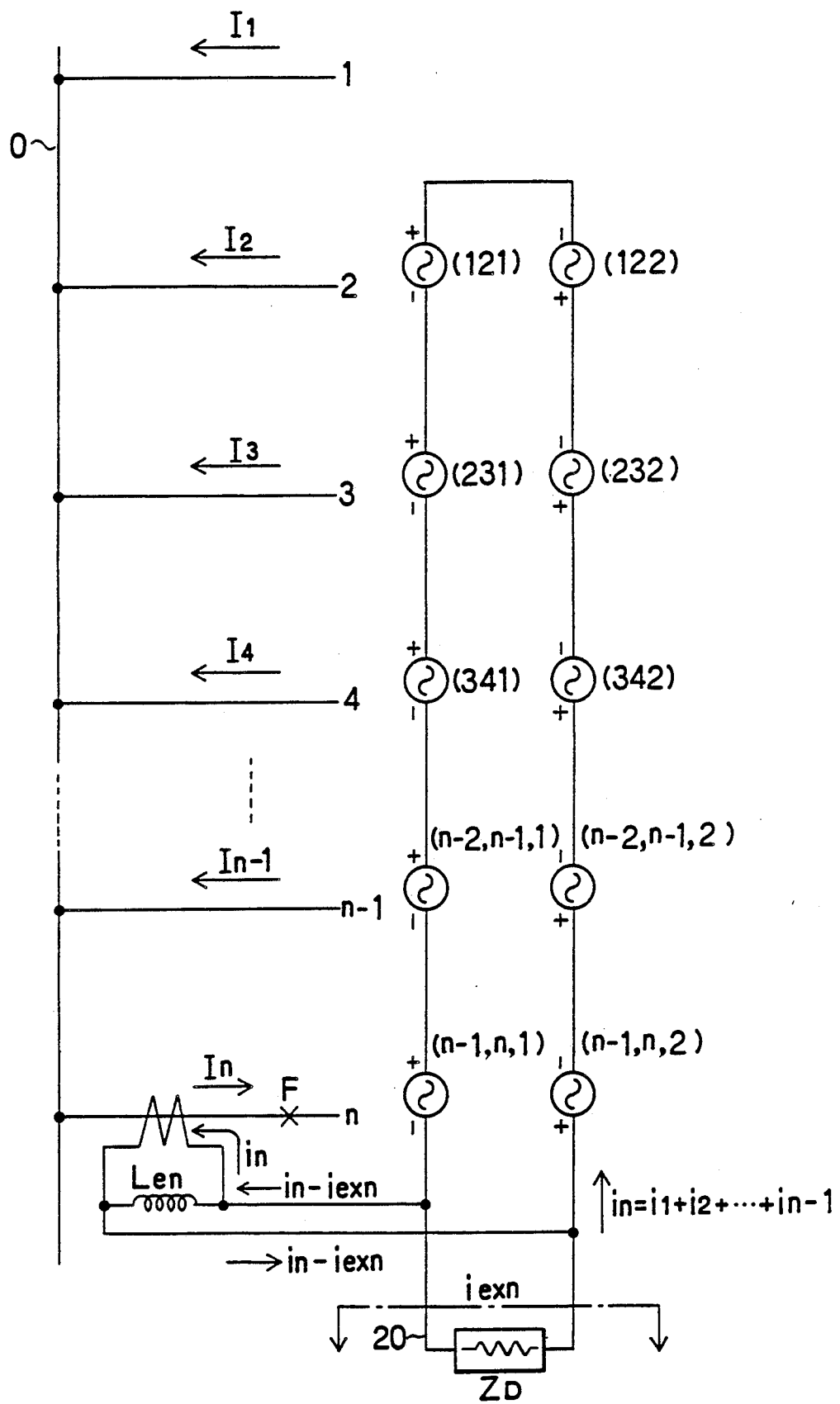
FIG. 2 is a schematic diagram of explaining the operation principle of the present invention in the case of an external fault.

In FIG. 2, there is shown a schematic diagram for explaining a basic operation of the present invention in the case that a heavy external fault occurs at a point "F" of the terminal "n" in the power system shown in FIG. 1. In this case, currents $I_1, I_2, \ldots, I_{n-1}$ flow in from the respective terminals 1 to n−1 through the bus bar 0 to the terminal "n", and above total current $I_n (=I_{FE})$ flows out from this terminal "n".

Since, there are provided a winding resistance "$R_S$" and a secondary lead resistance "$R_L$" in each of the above-described CT 11 to CT 1n−1 of the terminals 1 to n−1, voltage drops appearing across these resistances are the one along the equivalent circuits 121, 122, ..., (n−1, n, 1) (n−1, n, 2), as represented in FIG. 2.

As a consequence, it is a well known fact that the following differential circuit voltage "$V_D$" appears across the impedance "$Z_D$" of the differential circuit 20;

$$V_D \leq V_E = I_{FE}(R_S + R_L) \quad (2.1)$$

where "$V_E$" is equal to an error differential voltage, "$I_{FE}$" is equal to an external failure current (transformed to CT secondary), "$R_S$" is the secondary winding resistance of faulted terminal CT, and "$R_L$" is the lead wire resistance of the external fault terminal CT.

Figure 3:
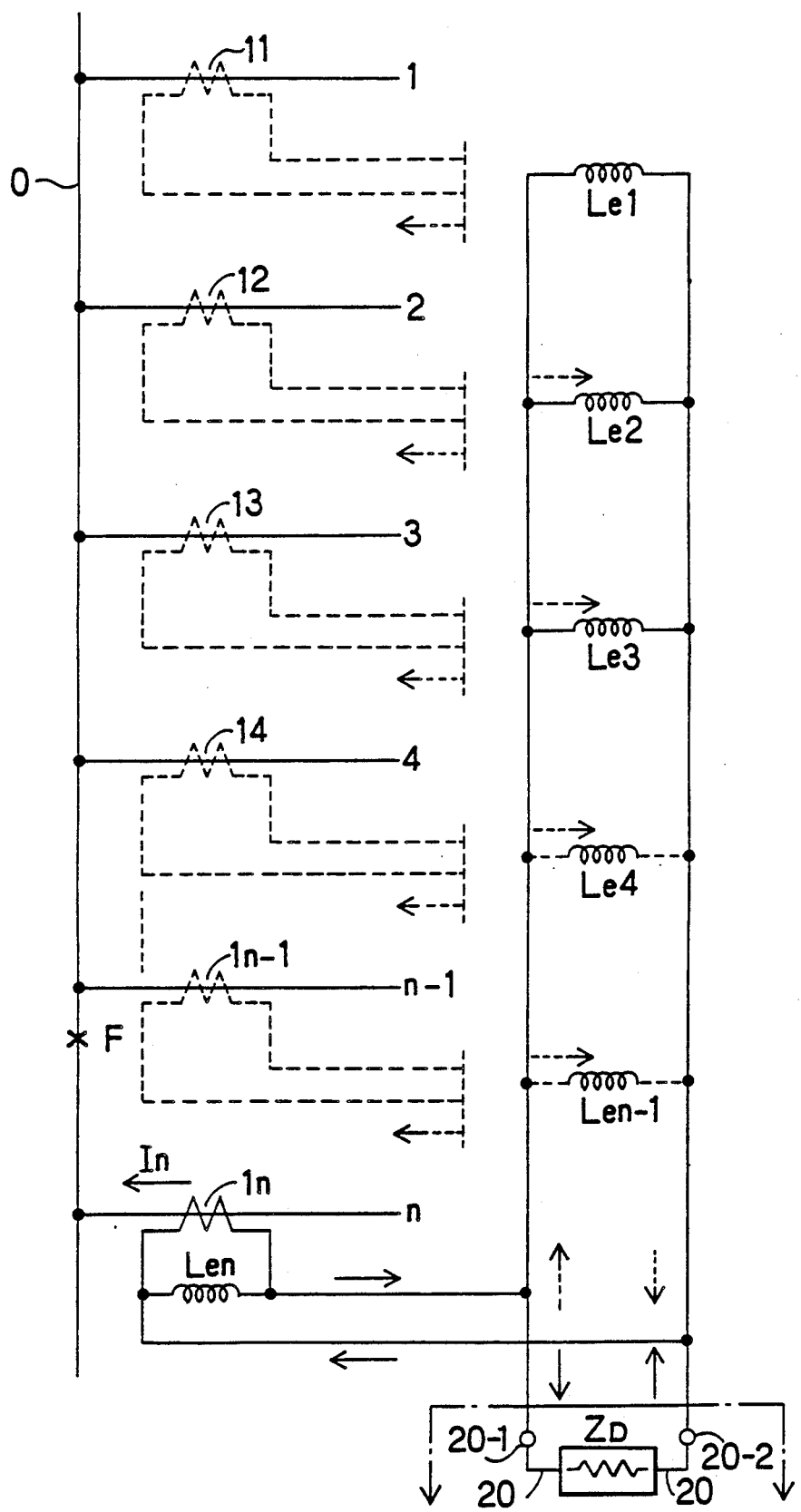
FIG. 3 is a schematic diagram for explaining the operation principle of the present invention in the case of an internal fault.

FIG. 3 is a schematic diagram for explaining principle operation for an internal minimum fault occurring at a point "F" in the bus bar "0" in the power system shown in FIG. 1, illustrating the current distribution. In this case, the detection current is minimum, and this minimum value is expressed for the CT secondary circuit by:

$$I_{Fmin} = n \cdot I_{ex} + I_R = n \cdot f_e(V_D) + g_Z(V_D) \quad (2.2)$$

where $I_{ex}=f_e(V_D)$ is a relationship known as the CT secondary exciting characteristics, $I_R=g_ZV_D)$ is also a relationship known as the impedance characteristic of the bus differential relay circuit, and "n" is equal to the number of the bus bar terminals.

In general, a value determined by the relational equation of $I_{ex}=f_e(V_D)$ is not so easily varied at site, but the impedance characteristic of the impedance $Z_D$ can be changed there. Normally, although a value determined by the relational equation of $I_R=g_Z(V_D)$ can be made sufficiently small, the CT secondary exciting characteristic defined by the equation of $I_{ex}=f_e(V_d)$ is not negligible in such a case that the differential circuit voltage $V_D$ required for operating the differential relay connected to the differential circuit 20 in case of the internal fault exceeds some value higher than 100 V. As a result, this gives an adverse influence to the minimum pick-up on the internal fault expressed in CT primary current.

Consequently, to avoid such an adverse influence, it is required to satisfy such a condition that the differential relay can be operated even if the differential circuit voltage "$V_D$" is much smaller.

Figure 4:
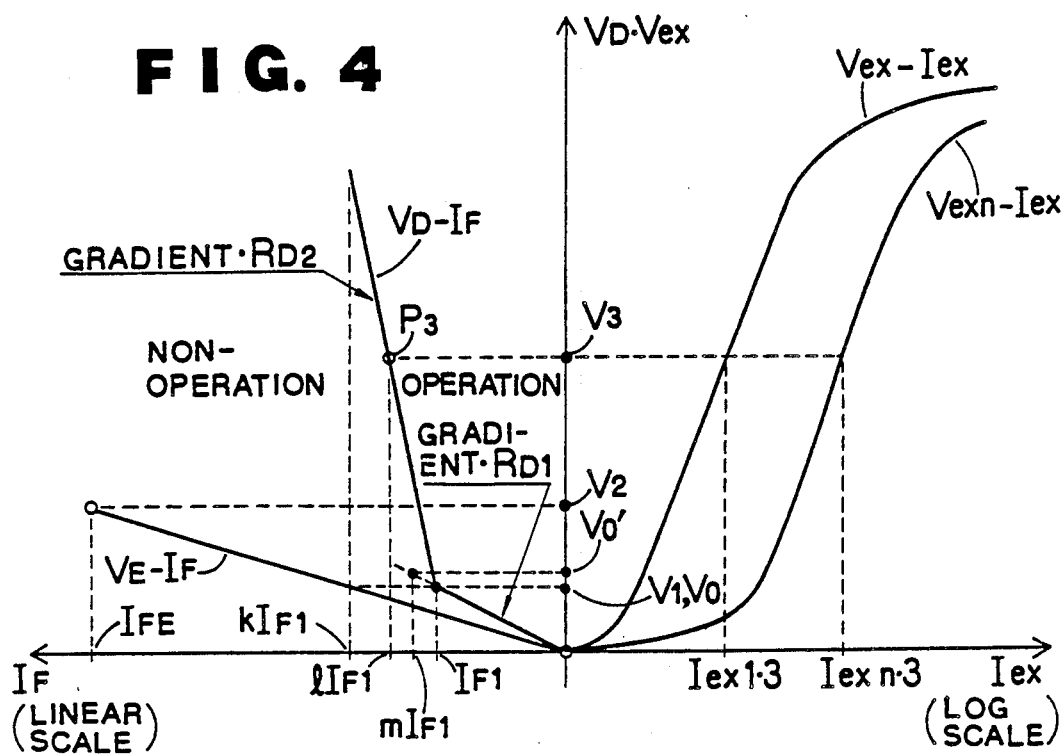
FIG. 4 is a voltage-current relationship for illustrating a basic characteristic according to the present invention.

Then, a description is made to the basic characteristics of the above-described differential protection with reference to FIG. 4. In FIG. 4, an ordinate denotes a differential circuit voltage "$V_D$" and also a CT secondary exciting voltage "$V_{ex}$" whereas an abscissa represents a fault current "$I_F$" in the left direction, and also indicates a CT secondary exciting current "$I_{ex}$" in the right direction.

Similarly, an operating characteristic of a differential relay 87 (this numeral also indicates the NEMA switch board device number) connected across the terminals 20-1 and 20-2 of the above-described differential circuit 20 is represented by "$V_D-I_F$", a CT secondary exciting characteristic is denoted by "$V_{ex}-I_{ex}$" and also an exciting characteristic in the case that "n" CTS having the same CT secondary exciting characteristic are connected in parallel is represented by "$V_{exn}-I_{ex}$".

The operation principles with such a characteristic setting for the various fault conditions will now be described as follows:

(i) Detection of an Internal Fault

Attention is given to a portion of a gradient of a resistor $R_{D1}$ employed in the differential circuit 20 along the operating characteristic $V_D-I_F$ of the differential relay 87 shown in the left half part of FIG. 4. The resistance value of the resistor $R_{D1}$ of the differential circuit 20 is selected to be a relatively lower value on the order of one ohm. The differential relay 87 starts to operate when the fault current $I_F$ flows in and the voltage value reaches the minimum pick-up differential voltage value "$V_1$". Assuming that the current at this time is equal to "$I_{F1}$", the detection sensitivity is expressed as follows under such a condition that "n" CTS are connected, and the differential voltage is applied to a set of the secondary circuits of CT which are connected in parallel to each other:

$$I_{Fmin} = I_{F1} + I_{exn.1} = I_{F1} + n\, I_{ex1.1} \quad (2.3)$$

where "$I_{exn.1}$" corresponds to a CT secondary exciting current at the minimum voltage value "$V_1$" in case that "n" CTS are connected in parallel to each other, and "$I_{ex1.1}$" represents a CT secondary exciting current at the minimum pick-up differential voltage value when one CT is connected.

It should be noted that if the minimum pick-up differential voltage $V_1$ is selected to be a lower value, equivalent pick-up currents on the systems primary side "$I_{F1}$" and "$I_{exn.1}$" with respect to this minimum operation differential voltage value $V_1$ become sufficiently small and therefore the reduction of the fault detecting sensitivity due to the CT secondary exciting characteristic can be controlled as desired at planning value.

In other words, the gradient of the operating characteristic $V_{D-IF}$ of the differential relay 87 is selected as low so that the differential circuit voltage $V_D$ at the minimum pick-up can be held low. At the same time, higher sensitivity is realized under such a condition because the CT secondary exciting current is small, and also a variation range of the minimum pick-up caused by variations of the number of terminals connected to the bus bar "0" is controlled below a predetermined value where no practical problem may occur.

(ii) Prevention of False Operation on a Maximum External Fault

In general, in case that "n" terminals 1 to n are connected to a bus bar "0", and an external fault occurs in the terminal "n" as shown in FIG. 2, the differential circuit voltage "$V_D$" appearing across the impedance "$Z_D$" in the differential circuit 20 is expressed by the above-described formula 2.1.

If the error differential voltage $V_E$ expressed in the above formula 2.1 is equal to "$V_2$" denoted in FIG. 4, and the voltage "$V_3$" is determined having a proper allowance ratio with respect to this error differential voltage $V_2$, the differential voltage detecting element which has been set to be operated upon this voltage "$V_3$" does not operate falsely even if the maximum external fault current flows through the bus bar "0". It should be noted that the internal fault current for producing the voltage $V_3$ is equal to a value "$lI_{F1}$" corresponding to a point "$P_3$" shown in FIG. 4, and the CT secondary exciting current varies between $I_{ex1.3}$ and $I_{exn.3}$. As a result, the system minimum pick-up value $I_{F'}$ (expressed in CT secondary current value) is given by:

$$lI_{F1} + I_{ex1.3} \leq I_{F'} \leq lI_{F1} + I_{exn.3} \quad (2.4)$$

In other words, this system minimum pick-up value varies in a range of:

$$lI_{F1} + I_{ex1.3} \sim lI_{F1} + nI_{ex1.3}$$

Thus, the minimum pick-up is considerably raised, as compared with that in case of the minimum pick-up current "$I_{F1}$".

(iii) Overall Operation

As there are two different values of "$I_{F1}$" and "$lI_{F1}$" in the above-described two cases, the following relationship should meet between them and also the $V_D - I_F$ characteristic should have the following broken line having two slope $R_{D1}$, $R_{D2}$ as expressed in FIG. 4.

$$V_D = R_{D1}I_F \quad (V_D \leq V_0 = V_1) \quad (2.5)$$

$$V_D = R_{D2}I_F + (R_{D1} - R_{D2})I_{F1} \quad (V_D \geq V_0 = V_1) \quad (2.6)$$

where $I_{F1} = V_0/R_{D1}$

That is to say, when the differential circuit voltage $V_D$ is low, a relatively low resistance value such as "$R_{D1}$" of the differential circuit 20 is given to the impedance $Z_D$, and when the differential circuit voltage $V_D$ is high, a relatively high resistance value such as "$R_{D2}$" of the differential circuit 20 is given to the impedance $Z_D$, with the result that the differential protective relay 87 according to the present invention operates as the current differential relay in the lower current range, and as the voltage differential relay in the higher current range.

The method for setting a value of the volta $V_0$ to switch the above-described $V_D - I_F$ characteristic is realized based upon the following principle. If a current at which the error differential voltage "$V_E$" (caused by the fluctuations in each CT characteristic and secondary circuit constants) reaches the minimum pick-up differential voltage value "$V_1$" which is set at high sensitivity as previously described, is k-time higher than the minimum operating current "$I_{F1}$", K is determined by satisfying the following equations:

$$V_E = \frac{R_{D1}R_2}{R_{D1} + R_2} kI_{F1} \quad (2.7)$$

$$V_1 = R_{D1}I_{F1} \quad (2.8)$$

$$R_{D1} \frac{R_2}{R_{D1} + R_2} \cdot kI_{F1} = R_{D1}I_{F1}$$

$$\therefore k = \frac{R_{D1} + R_2}{R_2} \quad (2.9)$$

In other words, when the resistor "$R_{D1}$" of the differential circuit 20 is selected to be a proper value, the value of "k" is always greater than 1, and also it is possible to determine $k > 1$.

As a result, if an amount of a fault current is equal to, or below than a value $m\,I_{F1}$, the switch for detecting the differential circuit voltage $V_0$ operates before the current differential element having the higher sensitivity operate falsely so that the impedance $Z_D$ of the differential circuit 20 is switched over to the high impedance, which can therefore be operated as the voltage differential element. As a consequence, there is no problem that the switching over operation is performed in accordance with the broken-line characteristic and two resistance values can be given depending upon the differential voltage magnitude $V_D$. For a reference, the switching over voltage $V_0$ for having two slope line characteristic of $V_D - I_F$ curve, can be set at $V_0$ being different from $V_1$ as follows considering the relationship between $V_0$ and error differential voltage $V_e$.

$$\frac{V_0'}{R_{D1}} = mI_{F1} < lI_{F1} \quad (2.10)$$

Figure 5:
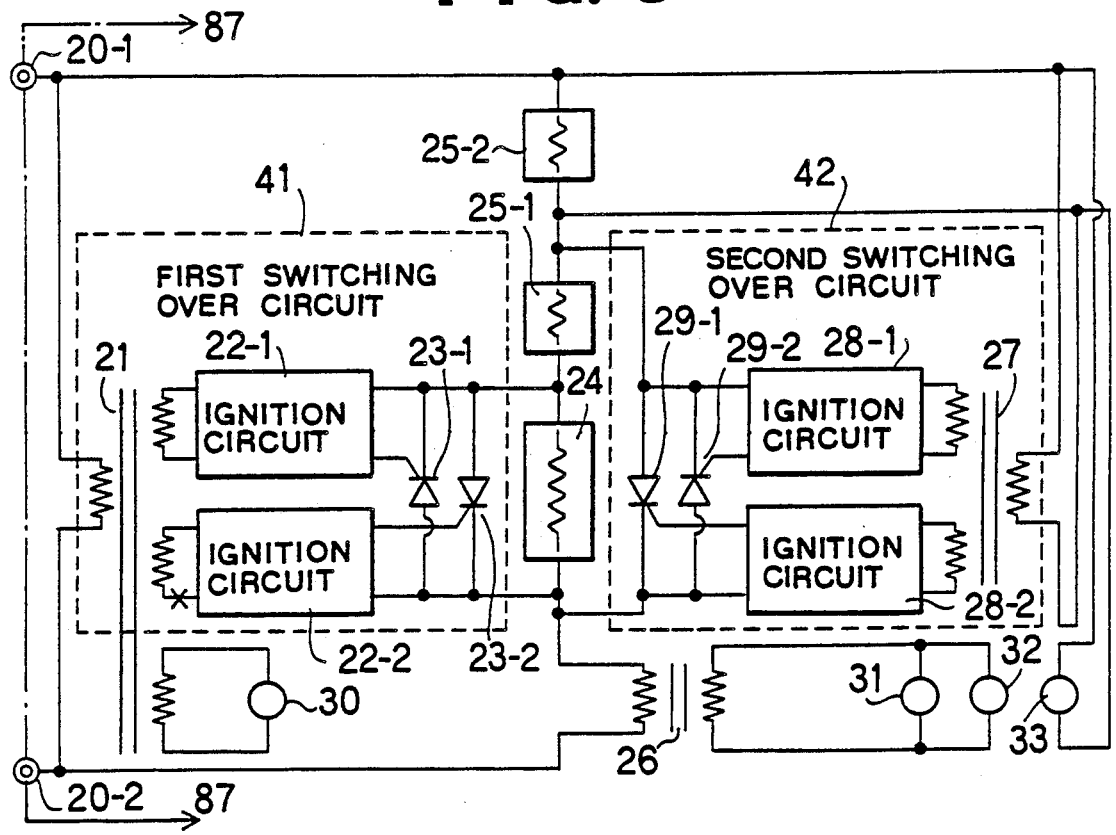
FIG. 5 is an internal schematic block diagram for representing a differential protective relay to which the differential protective relay scheme according to the present invention is applied; and, FIG. 6 is a circuit diagram of an interlock circuit of the differential relay according to the present invention.

Referring now to FIG. 5, an example of an internal schematic example of the differential relay 87 which is connected to the differential circuit 20 will be described. In FIG. 5, reference numerals 20-1, and 20-2 indicate connection terminals of the differential circuit 20; reference numeral 21 denotes a voltage transformer for transforming the voltage appearing across this connection terminal to a voltage having a proper value; reference numerals 22-1 and 22-2 denote ignition circuits for receiving secondary voltages having opposite polarities with each other from the voltage transformer 21 and for producing a voltage having a proper amplitude and a proper wave shape so as to turn ON/OFF a semiconductor power switch connected at the subsequent stage; and reference numerals 23-1 and 23-2 represent semiconductor power switches which are ignited by receiving the ignition voltages produced in the above-described ignition circuits 22-1 and 22-2 so as to switch voltage waves having opposite polarities with each other. Further, reference numeral 24 indicates a resistor which is opened or shortcircuited by means of the semiconductor power switches 23-1 and 23-2; reference numerals 25-1 and 25-2 are resistors series-connected to the resistor 24; reference numeral 26 indicates a transformer, the primary winding of which is series-connected to the resistors 24, 25-1 and 25-2; reference numeral 27 indicates a voltage transformer for transforming a voltage appearing across the resistor 25-2. The semiconductor power switches 29-1 and 29-2 are turned ON/OFF by the ignition circuits 28-1 and 28-2 connected to the secondary winding of this voltage transformer 27. Reference numeral 30 indicates a voltage detecting element connected to the quaternary winding of the above-described voltage transformer 21, for sensing an amplitude of a voltage appearing across the terminals 20-1 and 20-2. Reference numeral 31 indicates a voltage detecting element for detecting the voltage which has been transformed by the transformer 26 and for producing a signal "1" (to make a contact closed) when the primary current of the transformer 26 becomes a proper value which is obtained from the terminals 20-1 and 20-2 Reference numeral 32 indicates a voltage detecting element for producing a signal "1" (to make a contact closed) to detect the voltage transformed by the transformer 26 higher than the equivalent values of the voltages across the terminals 20-1 and 20-2. Reference numeral 33 represents a voltage (current) detecting element for detecting an amplitude of a voltage which is transformed by the above-described transformer 27 and operates when the CT secondary current is higher than a predetermined value as viewed from the terminals 20-1, 20-2 so as to form a proper output circuit at a heavy external fault.

It should be noted that the above-described transformer 21, ignition circuits 22-1 and 22-2, and semiconductor power switches 23-1 and 23-2 constitute a first switching over circuit 41 for changing the impedance of the differential circuit 20. Also, the above-explained transformer 27, ignition circuits 28-1 and 28-2, and semiconductor power switches 29-1 and 29-2 constitute a second switching over circuit 42 for changing the impedance of the differential circuit 20.

Figure 6:
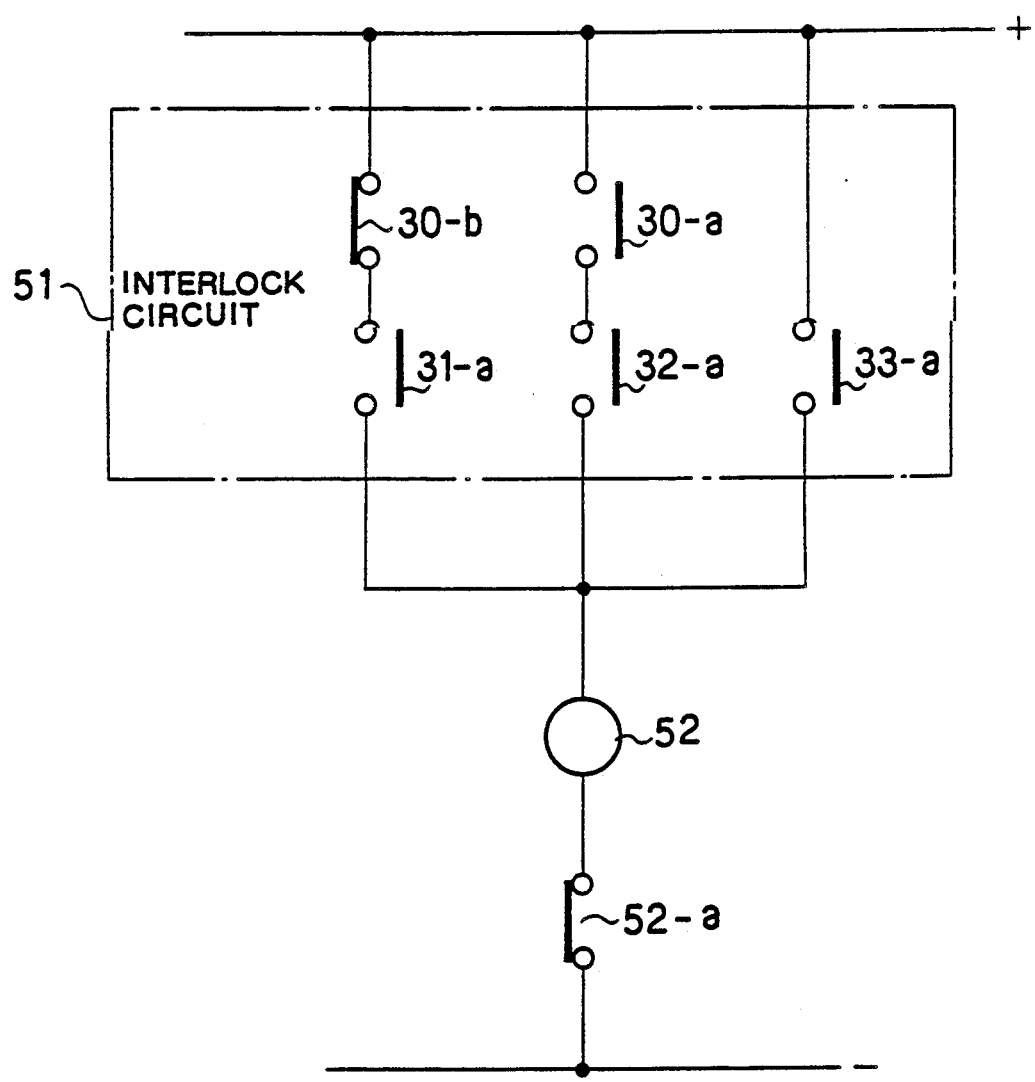

An interlock circuit 51 for tripping a circuit breaker is constituted by a judgement logic sequence connection, shown in FIG. 6, formed by the respective contacts 30-a, 30-b, 31-a, 32-a and 33-a which are switched by the output from the above-described detecting elements 30, 31, 32 and 33.

In FIG. 6, reference numeral 52 denotes a tripping coil of the circuit breaker; and reference numeral 52-a indicates a contact of the circuit breaker 52.

Now, the circuit overall operation of the differential relay 87 shown in FIG. 5 will be described.

(a) In Case of a Light Internal Fault

For instance, when a power source side is connected via a single transmission line "n" to the bus bar "0", a current may flow from a CT 1n of this terminal "n" to the differential circuit 20. At this time, since a voltage (differential voltage) appearing across the differential circuit 20 is low, the voltage which is applied via the voltage transformer 21 to the ignition circuits 22-1 and 22-2 is also low. As the result, the ignition circuits 22-1 and 22-2 do not fire without switching the semiconductor power switches 23-1 and 23-2, and the resistor 24 is shortcircuited.

As a result, the differential circuit 20 is operated as the low impedance circuit in which the resistors 25-1 and 25-2 having low values and the primary winding of the transformer 26 are connected between the terminals 20-1 and 20-2. In this case, the operation of the differential relay 87 is the operation of the low-impedance current-differential relay.

It should be noted that the voltage detecting element 30 of the differential circuit 20 is reset (the contact 30-b is closed) and therefore do not lock the operation of the voltage detecting element 31.

(b) In Case of a Medium Internal Fault

In this fault case, the fault currents are supplied from not only the above-described CT 1n but also from some of the terminals having the power sources to the internal fault point. As a consequence, the voltage across the differential circuit 20, namely the voltage between the terminal 20-1 and 20-2 is further increased as compared with the previous case. As a result, the voltage which is applied via the voltage transformer 21 to the ignition circuits 22-1 and 22-2 is also increased. Thus, the ignition circuits 22-1 and 22-2 ignite the semi-conductor power switches 23-1 and 23-2 so that a path between the anode and cathode being shorted is now opened. Therefore, between the terminals 20-1 and 20-2, the resistors 24, 25-1, and 25-2, and also the primary winding of the transformer 26 are connected in series, with the result that the differential circuit 20 shows the higher impedance. At this time, if the current flowing through the primary winding of the transformer 26 is detected, and the voltage detecting element 32 having lower sensitivity operates so as to close the contact 32-a, it should be understood that the medium internal fault can be detected.

In this case, with the operation of the voltage detecting element 32, the differential relay 87 operates as the voltage differential relay. Also with the operations of the above-described semiconductor power switches 23-1 and 23-2, the voltage detecting element 30 operates to perform the interlock operation (the contact 30-a is closed and contact 30-b is opened).

(c) In Case of a Heavy Internal Fault

Similar to the above-described case of the medium fault, the fault currents are supplied from a number of terminals other than CT 1n to a fault point (F). As a result, a sufficient current flows between the terminals 20-1 and 20-2. Depending upon the resistors 25-1 and 25-2, and the impedance of the primary winding circuit of the transformer 26, the differential voltage is produced between both terminals of the differential circuit 20, namely terminals 20-1 and 20-2, and the voltage appearing across the transformer 21 also becomes sufficiently high. As a consequence, the voltages which are applied via the transformer 21 to the ignition circuits 22-1 and 22-2 are sufficiently increased. The ignition circuits 22-1 and 22-2 turn closing conditions of the semiconductor power switches 23-1 and 23-2 to open conditions. Thus, the shortcircuited resistor 24 is opened so that the differential voltage caused by the above-described resistors 24, 25-1, and 25-2 and also the primary winding of the transformer 26 becomes sufficiently high.

Therefore, the voltage across the resistor 25-2 is transformed by the transformer 27. The ignition circuits 28-1 and 28-2 are energized via this transformer 27 output so as to ignite the semiconductor power switches 29-1 and 29-2. As a result, the semiconductor power switches 29-1 and 29-2 turn on to provide the short circuit conditions, so that both the resistors 24 and 25-1 are shortcircuited. As a consequence, the impedance "$Z_D$" of the differential circuit 20 becomes sufficiently low and thus the value of the voltage is lowered to a proper level value.

Since the voltage detecting element 33 is set to detect a proper over voltage, the heavy fault condition is detected so as to derive an external isolated output for controlling circuit-breaker tripping circuits.

A setting of this voltage detecting element 33 is determined as follows. In case of the maximum external fault (fault current $I_{FE}$ max), the error differential current "$I_{DE}$" is expressed by:

$$I_{DE} = \frac{R_S}{R_D + R_S} I_{FE}\text{max}$$

Accordingly, no error operation happens.

The differential voltage "$V_D$" which is produced in the CT secondary (differential) circuit by the differential current occurring on the heavy internal heavy fault (fault current $I_{F1}$ max), is expressed by:

$$V_D = R_D I_D = R_D I_{F1}\text{max}$$

The value of this differential voltage is properly set as follows, which is sufficiently lower than the insulating withstand voltage $V_{BILS}$ of the CT secondary circuit:

$$\frac{R_D R_S}{R_D + R_S} \cdot I_{FE}\text{max} < V_D < R_D I_{F1}\text{max} < V_{BILS}$$

As a consequence, the voltage detecting element 33 can perform the proper operation.

(d) In Case of a Light External Fault

In case of an external fault, since an algebraic sum on currents which have passed through the CT 11 to CT 1n of the terminals 1 to n connected differentially becomes zero, no current flows through both the terminals 20-1 and 20-2 of the differential circuit 20, and no sufficient input can be obtained to operate the respective detecting elements 31, 32, 33. However, in a practical case, there is a differential current formed by accumulating errors, namely an algebraic sum current due to the manufacturing errors of CTs. A degree of this algebraic sum current is directly proportional to a degree of the passing current. Since the value of this current is small in case of the light fault, the voltage detecting element 31 with the proper setting of voltage does not operate.

A ratio "k" of the limit current value of the false operation when the external fault current passes to the internal fault pick-up current is significantly influenced by the combination of the impedance "$Z_D$" of the differential circuit 20, the CT secondary winding resistance $R_S$, and the CT secondary lead wire resistance $R_L$. When the first switching over circuit 41 is reset condition in case of the light fault, it is selected that the voltage detecting element 31 does not operate, so that no false operation occurs.

(e) In Case of a Heavy External Fault

In case that a heavy external fault current passes through, there are some possibilities of the false operation of the above described voltage detecting element 31 if a value of this failure current becomes large.

If the operating voltage of the first switching over circuit 41 is so selected as to operate at a differential current lower than the above-described value of the fault current, the switching over operation thereof is carried out at a lower current than the fault current which may cause the false operation of the voltage detecting element 31. Thus, the differential circuit 20 becomes a high impedance circuit in which the resistors 24, 25-1 and 25-2, and the primary winding of the transformer 26 are connected in series.

If the impedance of the differential circuit 20 becomes high, the differential circuit 20 cannot obtain a sufficient differential current for its operation unless a voltage having a value higher than a predetermined value is applied thereto, so that this differential circuit 20 does not operate falsely.

When the pick-up of the voltage detecting element 32 is so set that no false operation of this element occurs at the voltage produced by the differential circuit in case that the maximum external failure current passes through, the voltage detecting element 32 does not operate falsely even if the maximum current passes through the bus on the heavy external fault. As a whole, no false trip of the bus occurs.

As previously described in the previous operation item of the heavy internal fault, the current (voltage) detecting element 33 for detecting the heavy internal fault is set at a sufficiently high current value, so that no false operation thereof occurs by the error differential current "$I_{DE}$" which is induced by the external fault current in one terminal connected to the bus bar "0", and also care is taken into an allowable safety limit value for CTs. As a consequence, the current (voltage) detecting element 33 never falsely operates.

It should be noted that the above-described preferred embodiments are merely examples according to the invention. Therefore, it is apparent that various arrangements may be conceived without departing from the technical scope of the present invention, which are clearly involved by the claims.

While has been described above, in accordance with the present invention, since the impedance of the differential circuit is switched depending on the terminal voltage of the differential circuit, or the terminal voltage of a part of the impedance, whether the high impedance differential relay or the low impedance differential relay operates is automatically selected, and the drawbacks inherent in the respective differential relay scheme are solved, the sensitivity of the differential protective relay apparatus can be increased to surely detect the faults even with a light internal fault current. Therefore, there are great advantages by utilizing the present invention in the actual power system.

What is claimed is:

1. A differential protective relaying apparatus comprising:
   a plurality of lines connected to a bus bar;
   a current transformer provided in each of said lines;
   a differential circuit connecting each of secondary windings of the respective current transformers in parallel;
   a first switching over circuit for changing an impedance of said differential circuit from a first value into a second value depending upon a terminal voltage of the differential circuit;
   a second switching over circuit for changing said impedance from said second value into a third value depending upon the terminal voltage of said impedance;
   a plurality of voltage detecting elements for detecting said terminal voltage of said differential circuit and said terminal voltages of said impedance; and,
   an interlock circuit for tripping a circuit breaker which is constituted by a judgment logic sequence connection of contacts that are switched by the output of said voltage detecting elements respectively.

2. A differential protective relaying apparatus as claimed in claim 1, wherein said impedance of the differential circuit is constructed of a plurality of resistors and a primary winding of a voltage transformer connected in series.

3. A differential protective relaying apparatus as claimed in claim 1, wherein said first switching over circuit comprises a voltage transformer for transforming a voltage appearing across said differential circuit; ignition circuits connected to a secondary winding and a tertiary winding of said voltage transformer; and semiconductor power switches triggered by said ignition circuits and connected in parallel to each other, for selectively short circuiting a part of the resistors which constitute said impedance of the differential circuit, so as to change the impedance.

4. A differential protective relaying apparatus as claimed in claim 1, wherein said second switching over circuit comprises a voltage transformer for transforming a voltage appearing across a part of resistors which constitute said impedance of said differential circuit; ignition circuits connected to a secondary winding and a tertiary winding of said voltage transformer; and semiconductor power switches switched by outputs from the ignition circuits and connected in parallel to each other, for shortcircuiting or opening a part of the resistors which constitute said impedance of the differential circuit, so as to change said impedance from the second value into the third value.

5. A differential protective relaying apparatus as claimed in claim 1, wherein said plurality of voltage detecting elements comprise a first voltage detecting element connected to the quaternary winding of a voltage transformer in said first changing circuit; a second and a third voltage detecting elements having different detecting sensitivities connected to a secondary winding of a voltage transformer whose primary winding is connected in series with said impedance of said differential circuit.

6. A differential protective relaying apparatus as claimed in claim 1, wherein said interlock circuit for tripping the circuit breaker is so arranged that each of contacts which are switched by a first voltage detecting element is connected in series to contacts which are switched by a second and a third voltage detecting elements respectively, and said contacts connected in series are connected in parallel to a contact which is switched by a fourth voltage detecting element.

7. A differential protective relaying apparatus as claimed in claim 1, wherein said interlock circuit for tripping the circuit breaker is so constructed that a lock out relay for tripping the circuit breaker is connected in series to a contact of a lock out relay.

* * * * *